(12) United States Patent
Subramanian

(10) Patent No.: US 9,940,272 B1
(45) Date of Patent: Apr. 10, 2018

(54) HARDWARE-BASED HANDLING OF MISSING INTERRUPT PROPAGATION

(71) Applicant: Juniper Networks, Inc., Sunnyvale, CA (US)

(72) Inventor: Ganesh Kumar Kuppa Subramanian, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 381 days.

(21) Appl. No.: 14/682,468

(22) Filed: Apr. 9, 2015

(51) Int. Cl.
*G06F 13/24* (2006.01)
*G06F 11/07* (2006.01)

(52) U.S. Cl.
CPC .............. *G06F 13/24* (2013.01); *G06F 11/07* (2013.01)

(58) Field of Classification Search
None
See application file for complete search history.

(56) References Cited

U.S. PATENT DOCUMENTS

| | | |
|---|---|---|
| 5,261,107 A | 11/1993 | Klim et al. |
| 5,768,620 A | 6/1998 | Johnson et al. |
| 5,894,583 A | 4/1999 | Johnson et al. |
| 6,543,000 B1 | 4/2003 | Wright |
| 7,111,157 B1 | 9/2006 | Hooper |
| 7,992,047 B2 | 8/2011 | Caffrey |
| 9,298,507 B2* | 3/2016 | Brown .................. G06F 9/5016 |
| 9,411,755 B2* | 8/2016 | Ravirala ................. G06F 13/24 |
| 2003/0065853 A1 | 4/2003 | Lary et al. |

FOREIGN PATENT DOCUMENTS

WO          WO 96/35168          3/1996

OTHER PUBLICATIONS

Andrew S. Tanenbaum; Structured Computer Organization; 1984; Prentice-Hall, Inc.; Second Edition; pp. 10-11.*
Intel, "Desktop 4th Generation Intel Core Processor Family, Desktop Intel Pentium Processor Family, and Desktop Intel Celeron Processor Family," Intel Corporation, Datasheet—vol. 1 of 2, Order No. 328897-010, Mar. 2015, 125 pages.
Intel, "Intel Low Pin Count (LPC), Interface Specification," Intel Corporation, Revision 1.1, Document No. 251289-001, Aug. 2002, 54 pages.
(Continued)

*Primary Examiner* — Idriss N Alrobaye
*Assistant Examiner* — Richard B Franklin
(74) *Attorney, Agent, or Firm* — Harrity & Harrity, LLP

(57) ABSTRACT

A circuit may receive an interrupt associated with a device. The interrupt may be sent by the device via an interrupt line associated with the device. The circuit may send the interrupt associated with the device. The interrupt may be sent via an interrupt line associated with the circuit. The circuit may start a missing interrupt timer, associated with the interrupt, based on sending the interrupt. The missing interrupt timer may be associated with a threshold amount of time by which the interrupt is to be serviced. The circuit may identify, based on the missing interrupt timer, the interrupt as a missing interrupt. The circuit may resend the missing interrupt via the interrupt line associated with the circuit. The missing interrupt may be resent to cause the missing interrupt to be serviced.

20 Claims, 8 Drawing Sheets

(56) References Cited

OTHER PUBLICATIONS

Wikipedia, "Platform Controller Hub," http://en.wikipedia.org/wiki/Platform Controller Hub, Mar. 30, 2015, 9 pages.
Juniper Networks, "PTX Series PIC/FPC Compatibility," http://www.juniper.net/documentation/en_US/releaseindependent/junos/topics/reference/general/picptxseriesfpccompatibility.Html, Mar. 16, 2015, 3 pages.
Juniper Networks, "PTX3000 Packet Transport Router Description," http://www.juniper.net/documentation/en_US/releaseindependent/junos/informationproducts/pathwaypages/ptxseries/ptx3000/index.html, Dec. 19, 2012, 4 pages.
Freescale, "P2020: QorIQ P2020/10 Single- and Dual-Core Communications Processors," http://www.freescale.com/webapp/sps/site/prod summary.jsp?code=P2020, Jun. 17, 2008, 1 page.
Compaq Computer Corporation et al. "Serialized IRQ Support for PCI Systems," Revision 6.0, Sep. 1, 1995, 11 pages.
IBM Knowledge Center, "Missing interrupt handler (MIH)," http://www-01.ibm.com/support/knowledgecenter/api/content/nl/en-us/SSLTBW_2.1.0/com.ibm.zos.v2r1.ieae200/mih.htm, Feb. 1, 2002, 2 pages.
Wikipedia, "Interrupt," http://en.m.wikipedia.org/wiki/Interrupt, Feb. 11, 2015, 11 pages.
Microsoft, "Interrupt Service Routines (Windows CE 5.0)," https://msdn.microsoft.com/en-us/library/ms892408.aspx, Jul. 30, 2004, 1 page.
StackExchange, "What does edge triggered and level triggered mean?" http://electronics.stackexchange.com/questions/21886/what-does-edge-triggered-and-level-triggered-mean, Nov. 6, 2011, 2 pages.
Juniper Networks, "PTX5000 Packet Transport Router Description," http://www.junipernet/documentation/en_US/release-independent/junos/information-products/pathway-pages/ptx-series/ptx5000/index.html, Feb. 2, 2015, 3 pages.

* cited by examiner

HARDWARE-BASED HANDLING OF MISSING INTERRUPT PROPAGATION

BACKGROUND

An interrupt is a signal (e.g., provided by hardware or software) to a processor indicating an event that needs attention. The interrupt may alert the processor to a condition that requires interruption of an action (e.g., execution of program code) that the processor is performing. The processor may respond by suspending performance of the action and calling an interrupt service routine (ISR) to deal with the event.

SUMMARY

According to some possible implementations, a circuit may comprise one or more components to: receive an interrupt associated with a device, where the interrupt may be sent by the device via an interrupt line associated with the device; send the interrupt associated with the device, where the interrupt may be sent via an interrupt line associated with the circuit; start a missing interrupt timer, associated with the interrupt, based on sending the interrupt, where the missing interrupt timer may be associated with a threshold amount of time by which the interrupt is to be serviced; identify, based on the missing interrupt timer, the interrupt as a missing interrupt; and resend the missing interrupt via the interrupt line associated with the circuit, where the missing interrupt may be resent to cause the missing interrupt to be serviced.

According to some possible implementations, a method may comprise: receiving, by a circuit, an interrupt associated with a device, where the interrupt may be provided by the device, and where the interrupt may be received via a first interrupt line; providing, by the circuit, the interrupt associated with the device, where the interrupt may be provided via a second interrupt line; initiating, by the circuit and after providing the interrupt, a timer associated with the interrupt, where the timer may correspond to a threshold amount of time by which the interrupt is to be serviced; determining, by the circuit, that the interrupt is not serviced within the threshold amount of time; identifying, by the circuit and based on determining that the interrupt was not serviced within the threshold amount of time, the interrupt as a missing interrupt; and re-providing, by the circuit, the missing interrupt, where the missing interrupt may be re-provided via the second interrupt line, and where the missing interrupt may be re-provided to cause the missing interrupt to be received by a processor associated with servicing the missing interrupt.

According to some possible implementations, a system may comprise one or more components associated with a stage of an interrupt tree to: receive, via an interrupt line associated with a device, an interrupt sent by the device; send, via an interrupt line associated with the one or more components, the interrupt associated with the device, where the interrupt may be sent to another stage of the interrupt tree; determine that the interrupt was not serviced within a threshold amount of time after sending the interrupt; identify, based on determining that the interrupt was not serviced within the threshold amount of time, the interrupt as a missing interrupt; resend the missing interrupt via the interrupt line associated with one or more components, where the missing interrupt may be resent to cause the missing interrupt to be serviced.

DETAILED DESCRIPTION

The following detailed description of example implementations refers to the accompanying drawings. The same reference numbers in different drawings may identify the same or similar elements.

In a microprocessor-based system, interrupts from multiple devices may be aggregated in an interrupt tree such that a master interrupt signal indicates the interrupts to a central processing unit (CPU). The CPU may call an Interrupt Service Routine (ISR) to service the interrupts (e.g., based on priorities of the interrupts). In some systems, interrupt detection may be implemented in hardware using level triggered interrupts (e.g., interrupts sent by maintaining an interrupt line at a high level or a low level) and/or edge triggered interrupts (e.g., interrupts sent by causing a level transition on the interrupt line, either a falling edge (high to low) or a rising edge (low to high)).

A missing interrupt occurs when the CPU does not receive an interrupt despite an interrupt being generated. For example, a missing interrupt may occur in a system that uses edge triggered interrupts during conditions that cause interrupts in rapid succession (herein referred to back-to-back interrupts), that cause an interrupt to be sent (e.g., to indicate an interrupt) before execution of the ISR has completed, or that cause spurious interrupts. This may result in a loss of interrupt communication to the CPU from the devices. In some cases, debounce delay logic implemented in hardware of the system may partially solve such a missing interrupt from occurring, but the debounce delay logic may be system specific and/or may cause varying amounts of delay associated with servicing the interrupts. Similarly, a missing interrupt handler may be implemented in software of the system in order to solve the missing interrupt issue, but the missing interrupt handler may be unable to handle a system that includes both edge triggered interrupts and level triggered interrupts.

Implementations, described herein, provide a hardware-based approach for detecting and resending a missing interrupt (e.g., in order to prevent propagation of the missing interrupt). Moreover, implementations described herein may be independent of debounce delay logic included in the system, and/or may be implemented in a system that includes both edge triggered interrupts and level triggered interrupts.

Figure 1:
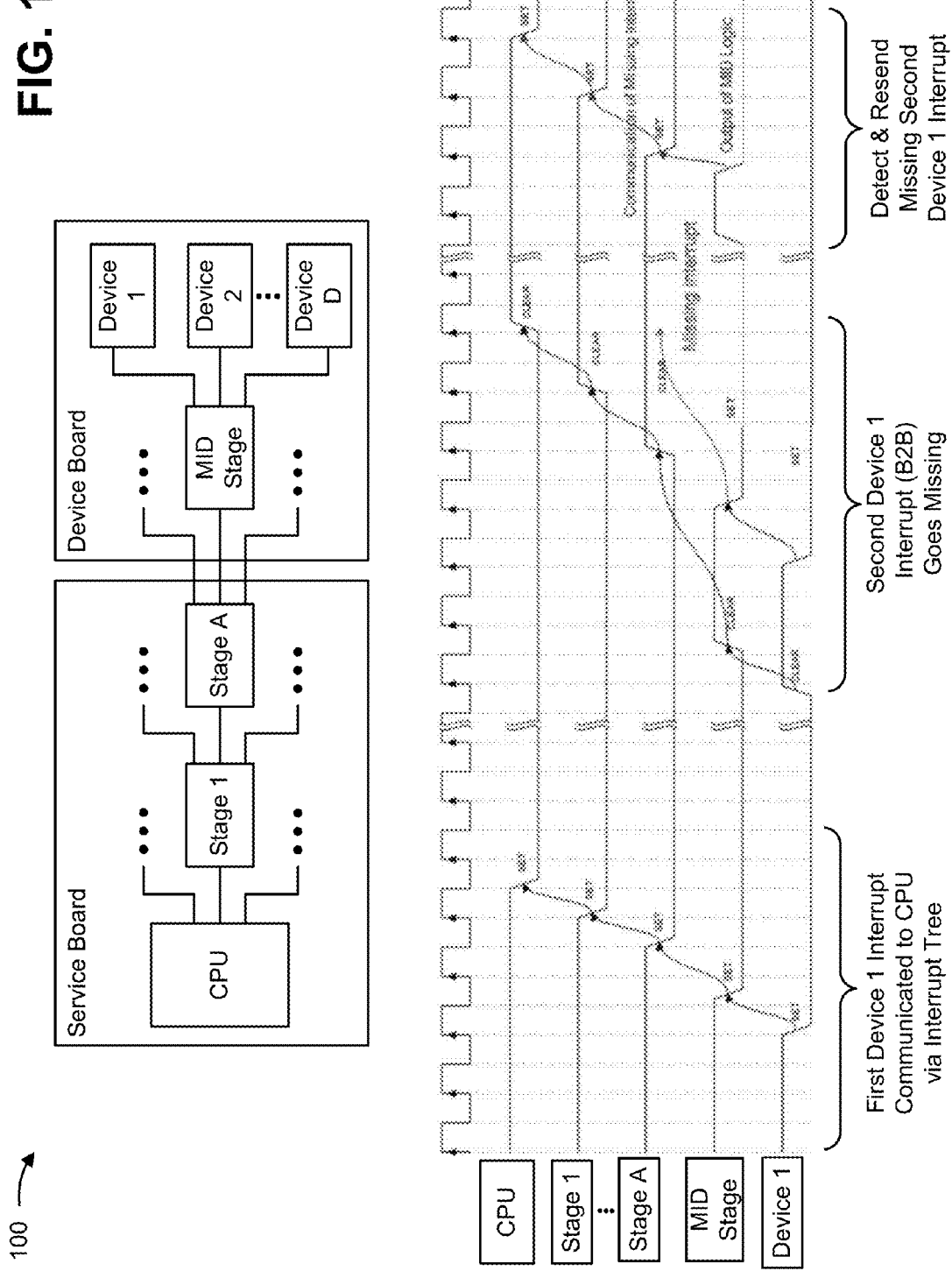
FIG. 1 is a diagram of an overview of an example implementation described herein.

FIG. 1 is a diagram of an overview of an example implementation 100 described herein. For the purposes of example implementation 100, and as shown in the upper portion of FIG. 1, assume that a CPU is configured to service interrupts associated with a group of devices (e.g., including device 1 through device D). Further, assume that the CPU is positioned to receive the interrupts via an interrupt tree that includes a group of stages (e.g., stage 1 through stage A, and a missing interrupt detection (MID) stage) on a set of circuit boards (e.g., identified as a service board and a device board).

As shown in the lower portion of FIG. 1, device 1 may experience a first interrupt, and may send the first interrupt on a device 1 interrupt line (e.g., by causing the device 1 interrupt line signal to maintain a low level). For the purposes of example implementation 100, assume that the MID stage is a level triggered interrupt stage. As further shown, the MID stage may receive the first interrupt (e.g., by detecting that the device 1 interrupt line signal is at the low level), and may send the first interrupt to stage A (e.g., by causing a level transition on a MID stage interrupt line). For the purposes of example implementation 100, assume that stage A is an edge triggered interrupt stage. As further shown, stage A may receive the first interrupt (e.g., by detecting that the MID stage interrupt line transitions from a high level to a low level). As further shown, stage A may similarly send the first interrupt to stage 1 (e.g., assume that stage 1 is a level triggered interrupt stage), and stage 1 may send the interrupt to the CPU.

For the purposes of example implementation 100, assume that the CPU services the first interrupt, and that the CPU is configured to clear the first interrupt (e.g., by clearing interrupt registers associated with device 1, the MID stage, stage A, and stage 1 and causing the respective interrupt lines to return to high levels) in order to indicate that the first interrupt has been serviced. As further shown in the lower portion of FIG. 1, the CPU may clear the first interrupt from the device 1 interrupt register and the MID stage interrupt register. However, as shown, assume that device 1 experiences a second interrupt before the CPU clears the first interrupt from the stage A interrupt register. As shown, device 1 may send the second interrupt via the device 1 interrupt line. The MID stage may receive the second interrupt, and may send the second interrupt to stage A (e.g., without debounce delay logic being implemented by the MID stage, after debounce delay logic is implemented by the MID stage, etc.).

As shown, after the MID stage provides the second interrupt, the CPU may clear the first interrupt from the stage A interrupt register. Here, since the stage A interrupt register was not cleared (e.g., and the stage A interrupt line was still at the low level) before the second interrupt was provided by the MID stage, the interrupt becomes a missing interrupt. As shown, the CPU may continue clearing the first interrupt from the other interrupt registers, while the MID stage interrupt line and the device 1 interrupt line remain at the low level.

Assume that the MID stage is configured to check for interrupts, sent by devices connected to the MID stage, at a particular interval of time (e.g., every second, every 500 milliseconds (ms) after back-to-back interrupts, etc.). Here, the MID stage may check for interrupts sent by device 1 through device D, and may determine (e.g., based on information included in the MID stage interrupt register), that device 1 sent the second interrupt, and that the second interrupt was not serviced. The MID stage may then start a missing interrupt timer associated with the second interrupt. A missing interrupt timer may include a timer that, upon reaching a threshold amount of time (e.g., one second, 200 ms, etc.), indicates that an interrupt is a missing interrupt. Here, based on the missing interrupt timer, the MID stage may determine (e.g., when the missing interrupt timer reaches a threshold amount of time) that the second interrupt is a missing interrupt.

As further shown in the lower portion of FIG. 1, based on determining that the second interrupt is a missing interrupt, the MID stage may return the MID stage interrupt line to the high level, and may resend the second interrupt (e.g., by causing another level transition on the MID stage interrupt line). As shown, stage A may receive the interrupt, and may send the interrupt accordingly.

In this way, a missing interrupt may be detected and resent using a hardware-based approach. Here, the missing interrupt detection and resending may be independent of debounce delay logic included in a system, and/or may be implemented in a system that includes edge triggered interrupts and/or level triggered interrupts.

Figure 2:
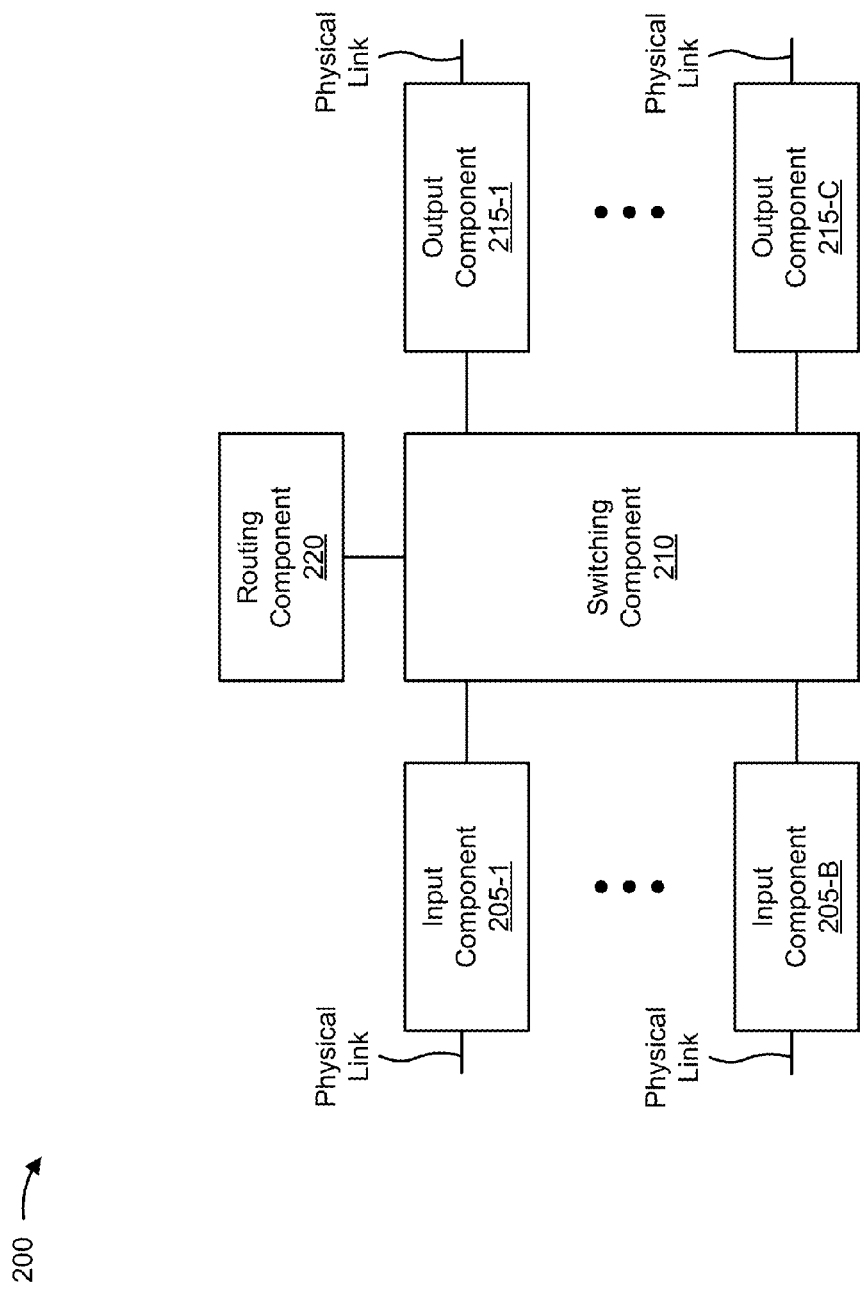
FIG. 2 is a diagram of an example environment in which systems and/or methods, described herein, may be implemented.

FIG. 2 is a diagram of an example environment 200 in which systems and/or methods, described herein, may be implemented. In some implementations, environment 200 may correspond to a network device, such as a router, a switch, a server, a gateway, a modem, a firewall, a network interface card (NIC), a hub, a bridge, an optical add-drop multiplexer (OADM), or another type of network device. While implementations described herein are described in the context of a network device, in some implementations, these implementations may be implemented in one or more other types of devices, such as by a user device, a server device, or the like. As shown in FIG. 2, environment 200 may include one or more input components 205-1 through 205-B (B≥1) (hereinafter referred to collectively as input components 205, and individually as input component 205), a switching component 210, one or more output components 215-1 through 215-C (C≥1) (hereinafter referred to collectively as output components 215, and individually as output component 215), and a routing component 220.

Input component 205 may include points of attachment for physical links and may be points of entry for incoming information, such as packets. Input component 205 may process incoming information, such as by performing data link layer encapsulation or decapsulation. In some implementations, input component 205 may send packets to output component 215 via switching component 210.

Switching component 210 may interconnect input components 205 with output components 215. Switching component 210 may be implemented using one or more of multiple, different techniques. For example, switching component 210 may be implemented via busses, via crossbars, and/or with shared memories. The shared memories may act as temporary buffers to store information from input components 205 before the information is eventually scheduled for delivery to output components 215. In some implementations, switching component 210 may enable input components 205, output components 215, and/or routing component 220 to communicate.

Output component 215 may include points of attachment for physical links and may be points of exit for outgoing information, such as packets. Output component 215 may store packets and may schedule packets for transmission on output physical links. Output component 215 may include scheduling algorithms that support priorities and guarantees. Output component 215 may support data link layer encapsulation or decapsulation, and/or a variety of higher-level protocols.

Routing component 220 may include one or more circuit boards, processors, microprocessors, field-programmable gate arrays (FPGAs), complex programmable logic devices (CPLDs), application-specific integrated circuit (ASICs), or similar types of components. In some implementations, routing component 220 may communicate with other devices, networks, and/or systems to exchange information regarding network topology. Routing component 220 may create routing tables based on the network topology information, create forwarding tables based on the routing tables, and forward the forwarding tables to input components 205 and/or output components 215. Input components 205 and/or output components 215 may use the forwarding tables to perform route lookups for incoming packets.

In some implementations, routing component 220 may be configured to receive, process, service, and/or clear interrupts via one or more devices included in routing component 220. Additional details regarding routing component 220, input component 205, and/or output component 215 are described below with regard to FIG. 3 and FIG. 4.

The number and arrangement of devices and components shown in FIG. 2 are provided as an example. In practice, there may be additional devices and/or components, fewer devices and/or components, different devices and/or components, or differently arranged devices and/or components than those shown in FIG. 2. Furthermore, two or more devices and/or components shown in FIG. 2 may be implemented within a single device and/or component, or a single device and/or component shown in FIG. 2 may be implemented as multiple, distributed devices and/or components. Additionally, or alternatively, a set of devices (e.g., one or more devices) and/or a set of components (e.g., one or more components) of environment 200 may perform one or more functions described as being performed by another set of devices and/or another set of components of environment 200.

Figure 3:
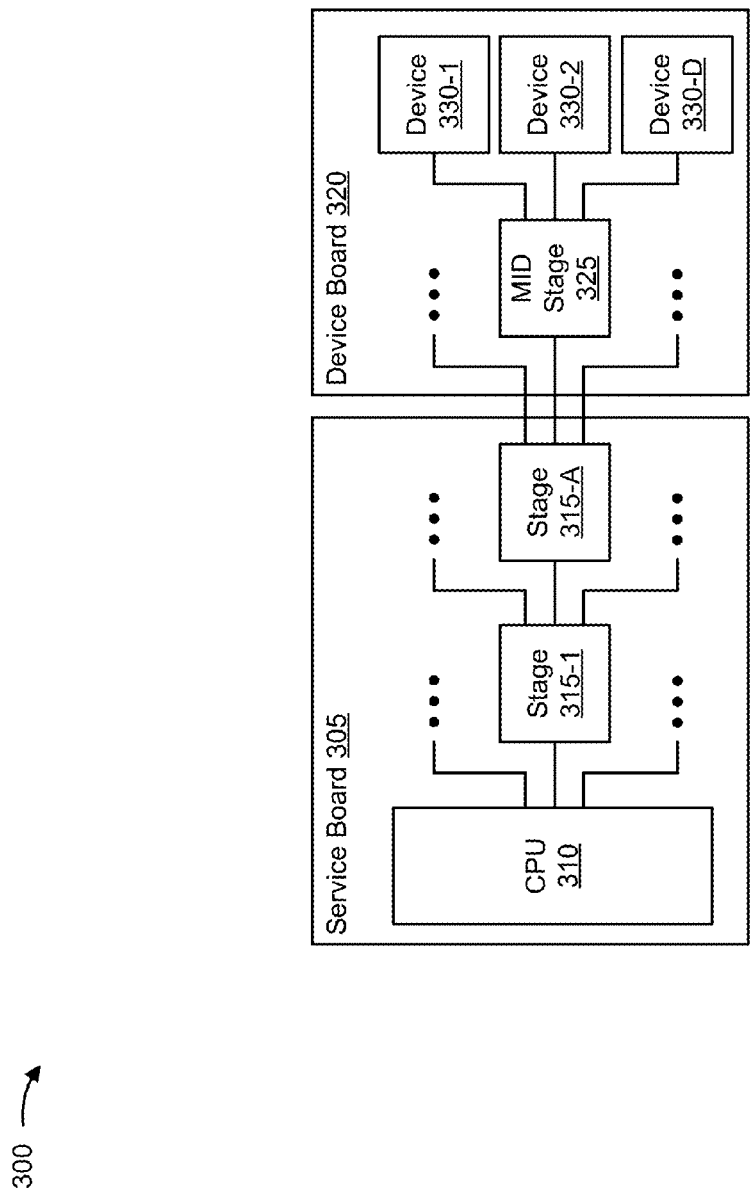
FIG. 3 is a diagram of example components of one or more components of the example environment of FIG. 2.

FIG. 3 is a diagram of example components 300 of one or more components of environment 200. In some implementations, example components 300 may be included in input component 205, switching component 210, output component 215, and/or routing component 220. As shown in FIG. 3, components 300 may include a service board 305 comprising a CPU 310 and one or more stages 315-1 through 315-A (A≥1) (hereinafter referred to collectively as stages 315 and individually as stage 315). As further shown, example components 300 may also include a device board 320 comprising a missing interrupt detector (MID) stage 325 and one or more devices 330-1 through 330-D (D≥1) (hereinafter referred to collectively as devices 330 and individually as device 330).

Service board 305 may include a circuit board that includes one or more components associated with receiving, servicing, clearing, providing, and/or processing interrupts associated with one or more devices 330. For example, service board 305 may include a circuit board (e.g., included in a line card, included in a flexible physical interface card concentrator (FPC), etc.) such as a processor mezzanine board (PMB), a daughterboard, a piggyback board, a motherboard, a routing engine board, or the like. In some implementations, service board 305 may include a CPU 310 and one or more stages 315.

CPU 310 may include a component capable of receiving, servicing, and/or clearing interrupts associated with one or more devices. CPU 310 is implemented in hardware, firmware, or a combination of hardware and software. For example, CPU 310 may include a CPU, a processor, a control unit, a microprocessor, and/or another type of similar component. In some implementations, CPU 310 may be capable of receiving interrupts via the interrupt tree, and servicing the interrupts (e.g., by calling an ISR). In some implementations, CPU 310 may be positioned such that CPU 310 is a root of an interrupt tree associated with servicing interrupts sent by one or more devices 330. In some implementations, CPU 310 may be positioned such that CPU 310 may receive interrupts from multiple stages 315. For example, CPU 310 may be positioned to receive interrupts from a group of stages 315 that comprises a first level of an interrupt tree. In this example, each stage 315, of the group of stages 315 may be positioned to receive interrupts from corresponding multiple other groups of stages 315 (e.g., in order to form the interrupt tree).

Stage 315 may include a component capable of receiving, sending, storing, processing, propagating, and/or providing interrupts associated with one or more devices 330. For example, stage 315 may include a FPGA, a CPLD, an ASIC and/or another similar type of device. In some implementations, stage 315 may be positioned such that stage 315 provides interrupts to CPU 310 (e.g., when stage 315 is on a first level of an interrupt tree). Additionally, or alternatively, stage 315 may be positioned such that stage 315 provides the interrupts to another stage 315 (e.g., when stage 315 is on a level of the interrupt tree above the first level of the interrupt tree). In some implementations, one or more stages 315 may be located on service board 305 and/or device board 320.

In some implementations, stage 315 may be a level triggered interrupt stage. Alternatively, stage 315 may be an edge triggered interrupt stage. In some implementations, service board 305 may include multiple stages 315 (e.g., on multiple levels of the interrupt tree), where each stage 315 may be a level triggered interrupt stage or an edge triggered interrupt stage (e.g., such that the interrupt tree includes only level triggered interrupt stages, only edge triggered interrupt stages, or both level triggered interrupt stages and edge triggered interrupt stages).

Device board 320 may include a circuit board that includes one or more components associated with receiving, providing, and/or processing interrupts associated with one or more devices 330 and detecting and resending missing interrupts. For example, device board 305 may include a circuit board included in a physical interface card (PIC), a control board, or the like. In some implementations, multiple device boards 320 may be connected to service board 305. In some implementations, device board 320 may include one or more MID stages 325 and one or more devices 330. Additionally, or alternatively, device board 320 may include one or more stages 315.

MID stage 325 may include a component capable of receiving, sending, storing, processing, propagating, and/or providing interrupts associated with one or more devices 330, and detecting and resending missing interrupts associated with the one or more devices 330. For example, MID stage 325 may include a FPGA, a CPLD, an ASIC, and/or another similar type of device. In some implementations, MID stage 325 may be positioned such that MID stage 325 receives interrupts sent by one or more devices 330. Additionally, or alternatively, MID stage 325 may be a level triggered interrupt stage or an edge triggered interrupt stage. In some implementations, multiple MID stages 325 may be positioned to provide interrupts to a single stage 315. Additional details of MID stage 325 are described below with regard to FIG. 4.

Device 330 may include a device capable of sending an interrupt in order to cause CPU 310 to service the interrupt. For example, device 330 may include an optical transceiver module (e.g., a small form-factor pluggable plus (SFPP) module, a quad-form factor pluggable plus (QSPP) module, a C form-factor pluggable (CFP) module, a CFP2 module, etc.), an Ethernet controller, a peripheral component interface express (PCIe) switch, a universal serial bus (USB) port, a serial advanced technology attachment device, an FPC, a PIC, or another type of device capable of sending an interrupt. In some implementations, device 330 may send the interrupt to MID stage 325 via an interrupt line corresponding to device 330. In some implementations, multiple devices 330 may be positioned to send interrupts to a single MID stage 325.

The number and arrangement of components shown in FIG. 3 are provided as an example. In practice, example components 300 may include additional components, fewer components, different components, or differently arranged components than those shown in FIG. 3. Additionally, or alternatively, a set of components (e.g., one or more components) of example components 300 may perform one or more functions described as being performed by another set of components of example components 300.

Figure 4:
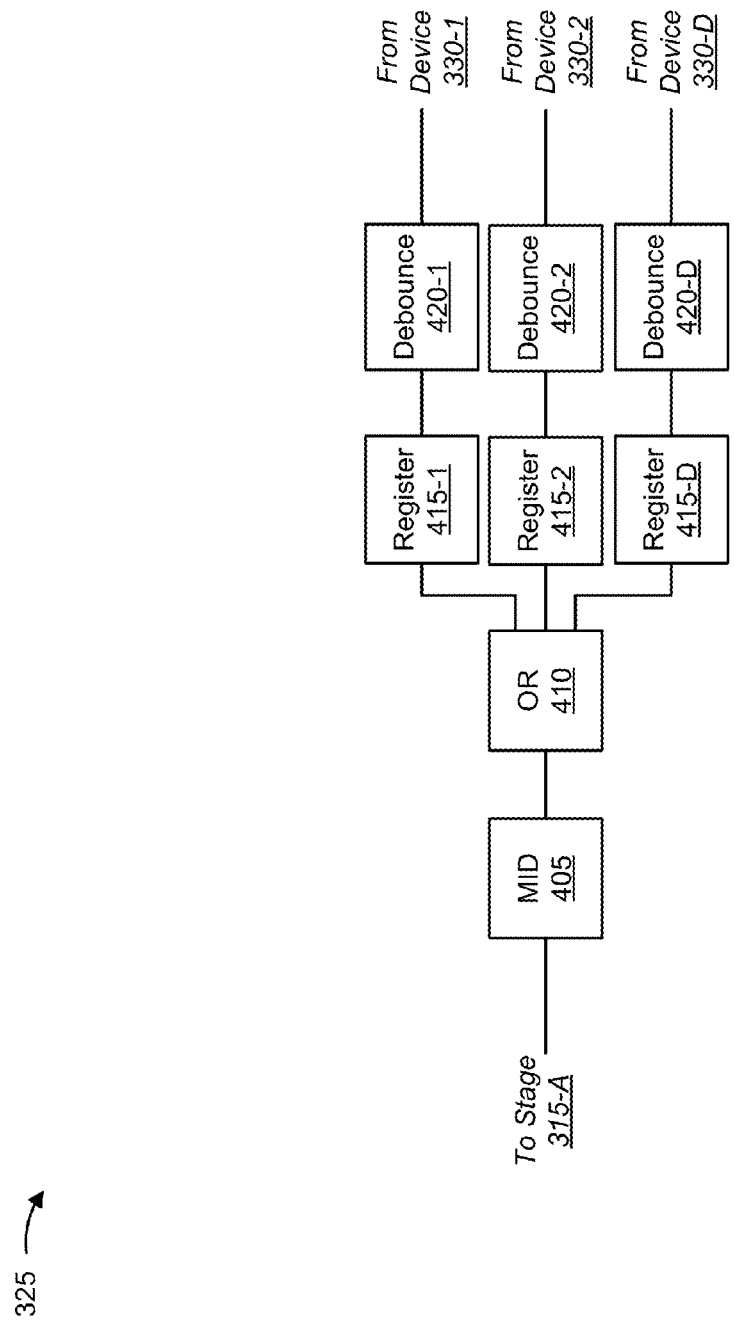
FIG. 4 is a diagram of example components of a missing interrupt detector stage of FIG. 3.

FIG. 4 is a diagram of example components of MID stage 325 and/or stage 315 shown in FIG. 3. As shown in FIG. 4, MID stage 325 and/or stage 315 may include a MID 405, an OR component 410, one or more registers 415-1 through 415-D (D≥1) (hereinafter referred to collectively as registers 415 and individually as register 415), and one or more debounces 420-1 through 420-D (D≥1) (hereinafter referred to collectively as debounces 420 and individually as debounce 420).

MID 405 may include a component capable of implementing logic used to detect missing interrupts associated with one or more devices 330. For example, MID 405 may include a timer component associated with identifying a missing interrupt. In some implementations, MID 405 may be capable of checking for a sent interrupt, associated with device 330, and starting a missing interrupt timer associated with the interrupt. Additionally, or alternatively, MID 405 may be capable of determining (e.g., based on information stored by register 415) that the interrupt is a missing interrupt, and resending the missing interrupt.

OR component 410 may include a component capable receiving, processing, sending, and/or providing interrupts associated with one or more devices 330. For example, OR component 410 may include an OR gate and/or another type of component capable of receiving multiple interrupts, determining an order in which the interrupts are to be sent for service, and sending the interrupts based on the order (e.g., such that only one interrupt is sent at a time). In some implementations, OR component 410 may be positioned such that OR component may receive interrupts associated with multiple devices 330.

Register 415 may include a component capable of receiving, storing, and/or providing an interrupt associated with device 330. For example, register 415 may include a memory component capable of receiving an interrupt from device 330, storing the interrupt, and providing the interrupt (e.g., in order to cause the interrupt to be serviced by CPU 310). In some implementations, register 415 may store an interrupt until the interrupt is serviced by CPU 310 and/or cleared from register 415 (e.g., after CPU 310 services the interrupt). In some implementations, register 415 may correspond to one or more devices 330.

Debounce 420 may include a component capable of implementing debounce logic associated with interrupts received from device 330. For example, debounce 420 may include a logic component capable of receiving a first interrupt, forwarding the first interrupt, receiving a second interrupt, and delaying (e.g., for a particular amount of time) forwarding the second interrupt in an attempt to avoid the second interrupt from becoming a missing interrupt. In some implementations, the amount of time that the interrupt is delayed may correspond to device 330. In some implementations, debounce 420 may correspond to one or more devices 330.

The number and arrangement of components shown in FIG. 4 are provided as an example. In practice, MID stage 425 and/or stage 315 may include additional components, fewer components, different components, or differently arranged components than those shown in FIG. 4. Additionally, or alternatively, a set of components (e.g., one or more components) of MID stage 425 and/or stage 315 may perform one or more functions described as being performed by another set of components of MID stage 425 and/or stage 315.

Figure 5:
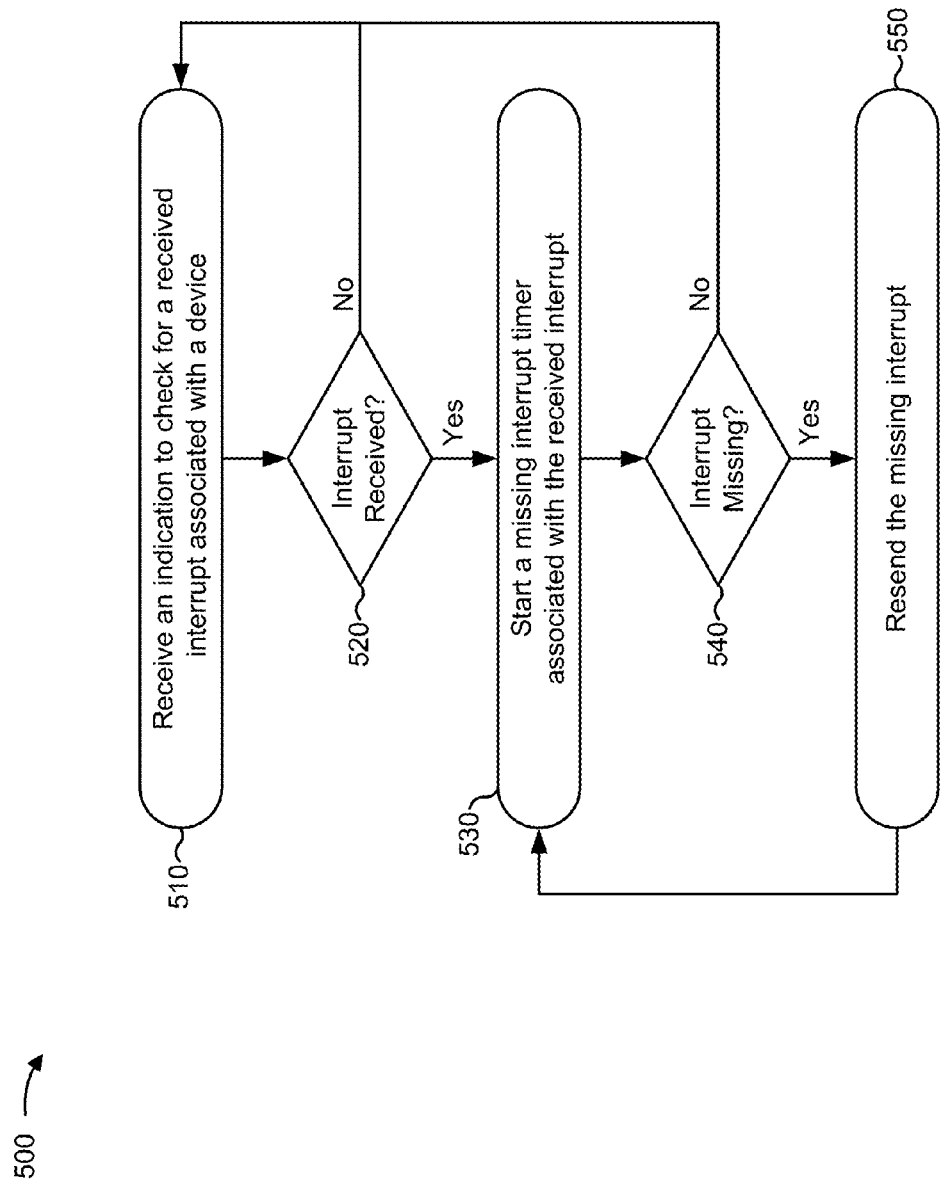
FIG. 5 is a flow chart of an example process for detecting a missing interrupt and resending the missing interrupt.

FIG. 5 is a flow chart of an example process 500 for detecting a missing interrupt and resending the missing interrupt. In some implementations, one or more process blocks of FIG. 5 may be performed by MID stage 325. In some implementations, one or more process blocks of FIG. 5 may be performed by another component or a set of components separate from or including MID stage 325, such as by one or more other example components of FIG. 3.

As shown in FIG. 5, process 500 may include receiving an indication to check for an interrupt associated with a device (block 510). For example, MID stage 325 may receive an indication to check for an interrupt associated with device 330. In some implementations, MID stage 325 may receive the indication after MID stage 325 receives one or more interrupts from device 330. Additionally, or alternatively, MID stage 325 may receive the indication based on a configuration of MID stage 325.

In some implementations, MID stage 325 may receive the indication based on receiving two or more interrupts from device 330. For example, MID stage 325 may be configured to check for an interrupt (e.g., that has not been serviced) when MID stage 325 receives two or more interrupts, associated with device 330, within a threshold amount of time, such as 1 ms, 2 ms, 5 ms, or the like (e.g., when MID stage 325 receives back-to-back interrupts). In this example, MID stage 325 may receive a first interrupt, may send the first interrupt, and may receive a second interrupt within the threshold amount of time. Here, MID stage 325 may send the second interrupt (e.g., with or without implementing debounce delay logic), and after an amount of time (e.g., 200 microseconds, 500 microseconds, 1 ms, etc.), may check whether the second interrupt is still awaiting service by CPU 310.

Additionally, or alternatively, MID stage 325 may receive the indication based on a configuration of MID stage 325. For example, MID stage 325 may receive an interrupt from device 330, and may provide the interrupt to stage 315. Here, MID stage 325 may be configured to check register 415, in order to determine whether the interrupt has been serviced, after an amount of time (e.g., 200 microseconds, 500 microseconds, 1 ms, etc.), and may check register 415, as described below.

In some implementations, MID stage 325 may receive indications to check for interrupts associated with multiple devices 330. For example, MID stage 325 may be positioned to receive interrupts from multiple devices 330, and may receive indications to check for interrupts associated with the multiple devices 330 accordingly.

As further shown in FIG. 5, process 500 may include checking for an interrupt associated with the device (block 520). For example, MID stage 325 may check for an interrupt associated with device 330. In some implementations, MID stage 325 may check for an interrupt when MID stage 325 receives the indication to check for an interrupt associated with device 330.

In some implementations, MID stage 325 may check for an interrupt based on information stored or accessible by MID stage 325. For example, MID stage 325 may receive an interrupt from device 330, and may store (e.g., in register 415) information associated with the interrupt. Here, MID stage 325 may check for an interrupt based on the information stored or accessible by MID stage 325 (e.g., if register 415 stores information associated with an interrupt, then MID stage 325 may determine that an interrupt has been received and has not yet been serviced).

As further shown in FIG. 5, if an interrupt has not been received (block 520—NO), then process 500 may include waiting to receive another indication to check for an interrupt associated with the device. For example, MID stage 325 may check for an interrupt, may determine that an interrupt has not been received (e.g., that no interrupt has been received, that all interrupts have been serviced and cleared, etc.), and may wait to receive another indication to check for an interrupt associated with the device, as described above with regard to block 510.

As further shown in FIG. 5, if an interrupt, associated with the device, has been received (block 520—YES), then process 500 may include starting a missing interrupt timer associated with the received interrupt (block 530). For example, MID stage 325 may check for a received interrupt, may determine than an interrupt has been received (e.g., that the interrupt has not been serviced and cleared), and may start a missing interrupt timer associated with the interrupt.

A missing interrupt timer may include a timer used to detect that an interrupt is missing. For example, the missing interrupt timer may include a timer that, upon reaching a threshold amount of time (e.g., 10 ms, 500 ms, 1 second, etc.) during which the interrupt is not serviced, may be used to identify the interrupt as a missing interrupt. In some implementations, the amount of time, associated with the missing interrupt timer, may be a user configured amount of time and/or a default amount of time. Additionally, or alternatively, the amount of time may be a static amount of time (e.g., such that the amount of time does not vary) or a dynamic amount of time (e.g., such that the amount of time varies in response to a quantity of devices, a quantity of interrupts received over time, etc.).

As shown in FIG. 5, process 500 may include identifying, based on the missing interrupt timer, whether the interrupt is a missing interrupt (block 540). For example, MID stage 325 may identify, based on the missing interrupt timer, whether the interrupt is a missing interrupt. In some implementations, MID stage 325 may determine whether the interrupt is a missing interrupt after MID stage 325 starts the missing interrupt timer.

In some implementations, MID stage 325 may identify whether the interrupt is a missing interrupt based on the missing interrupt timer. For example, MID stage 325 may start the missing interrupt timer (e.g., MID 405) and, when the missing interrupt timer reaches the threshold amount of time (e.g., 10 ms, 500 ms, 1 second, etc.), MID stage 325 may check to determine whether the interrupt has been cleared from register 415 (e.g., whether the interrupt has been serviced). As an example, MID stage 325 may determine (e.g., based on information stored or accessible by MID stage 325, such as information stored in register 415) if the interrupt has been cleared (e.g., based on being serviced by CPU 310). If the interrupt has not been cleared, then MID stage 325 may identify the interrupt as a missing interrupt (e.g., since the interrupt was not cleared by the time the missing interrupt service timer reached the threshold amount of time). Alternatively, if the interrupt has been cleared, then MID stage 325 may not identify the interrupt as a missing interrupt (e.g., since the interrupt was cleared before the missing interrupt service timer reached the threshold amount of time).

As further shown in FIG. 5, if the interrupt is not a missing interrupt (block 540—NO), then process 500 may include waiting to receive another indication to check for an interrupt associated with the device. For example, MID stage 325 may identify that the interrupt is not a missing interrupt, and MID stage 325 may wait to receive another indication to check for an interrupt associated with the device, as described above with regard to block 510.

As further shown in FIG. 5, if the interrupt is a missing interrupt (block 540—YES), then process 500 may include resending the missing interrupt. For example, MID stage 325 may identify the interrupt as a missing interrupt, and MID stage 325 may resend the missing interrupt.

In some implementations, MID stage 325 may resend the missing interrupt such that the missing interrupt is communicated to stage 315. For example, MID stage 325 may identify the interrupt as a missing interrupt, MID stage 325 may return the interrupt line, associated with stage 315, to a particular level (e.g., a high level, a low level, etc.) and may resend the missing interrupt via the interrupt line. As an example, MID stage 325 may resend the interrupt by returning the interrupt line to a high level, and causing another transition to a low level by the interrupt line such that stage 315 may detect the transition (e.g., when stage 315 is an edge triggered interrupt stage).

In some implementations, MID stage 325 may restart the missing interrupt timer (e.g., as described above with regard block 530), associated with the resent interrupt, may again determine whether the resent interrupt is a missing interrupt, and may proceed accordingly (e.g., such that MID stage 325 resends the interrupt until it is serviced). In some implementations, after the missing interrupt is serviced, MID stage 325 and/or CPU 310 may clear the interrupt (e.g., such that register 415 no longer stores the interrupt).

In this way, MID stage 325 may detect a missing interrupt in a system that includes edge triggered and/or level triggered interrupts. Moreover, MID stage 325 may detect and resend the missing interrupt without regard to debounce delay logic implemented in MID stage 325. As such, debounce delay logic may be configured for devices 330 and/or may be independently configured for each device 330.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
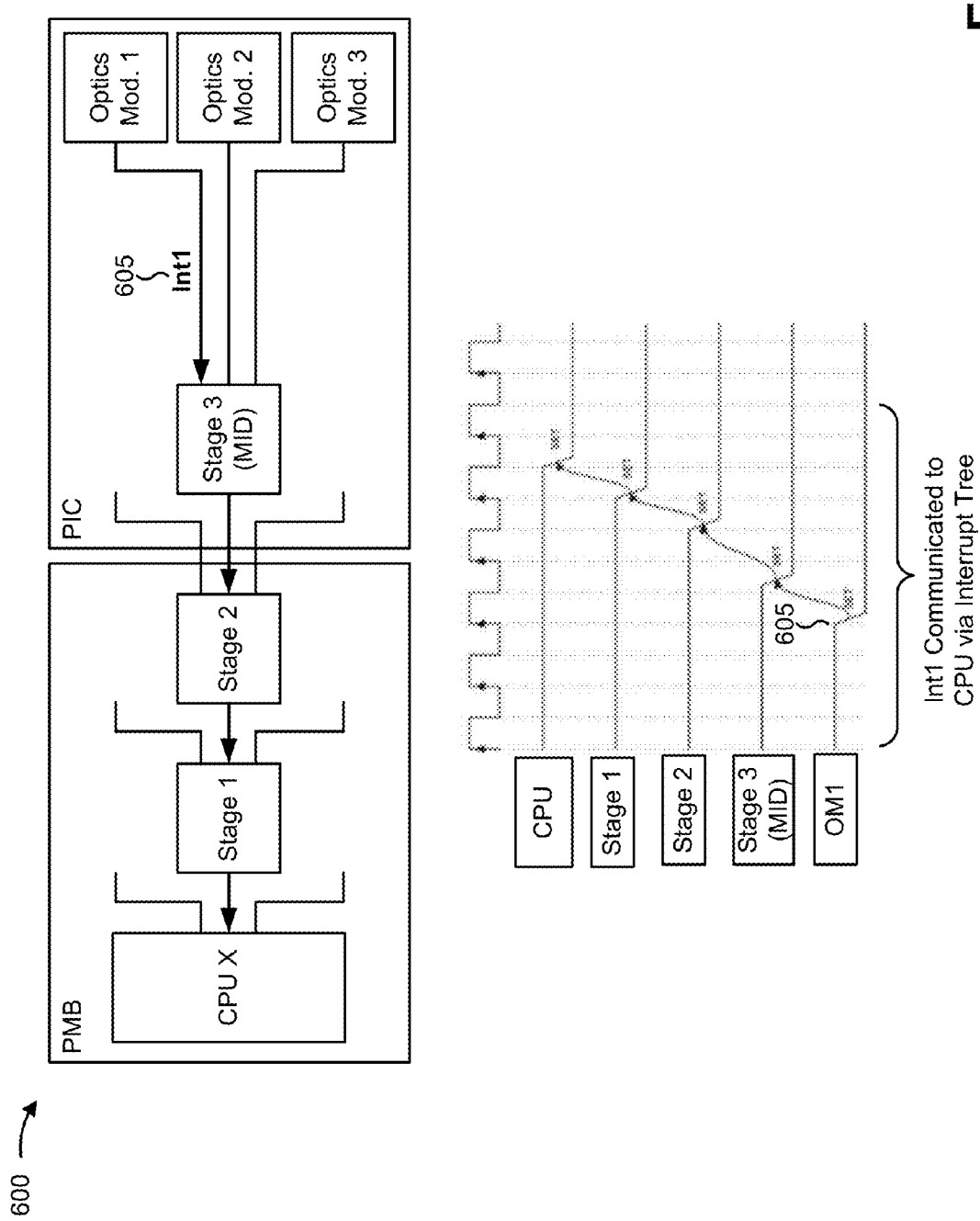
FIGS. 6A-6C are diagrams of an example implementation relating to the example process shown in FIG. 5.
Figure 6B:
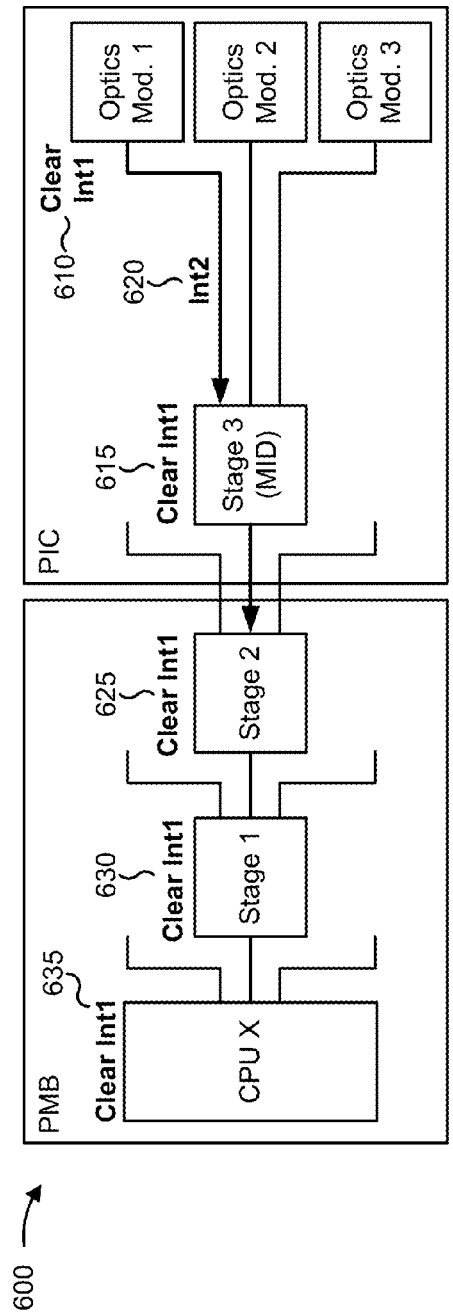
Figure 6B:
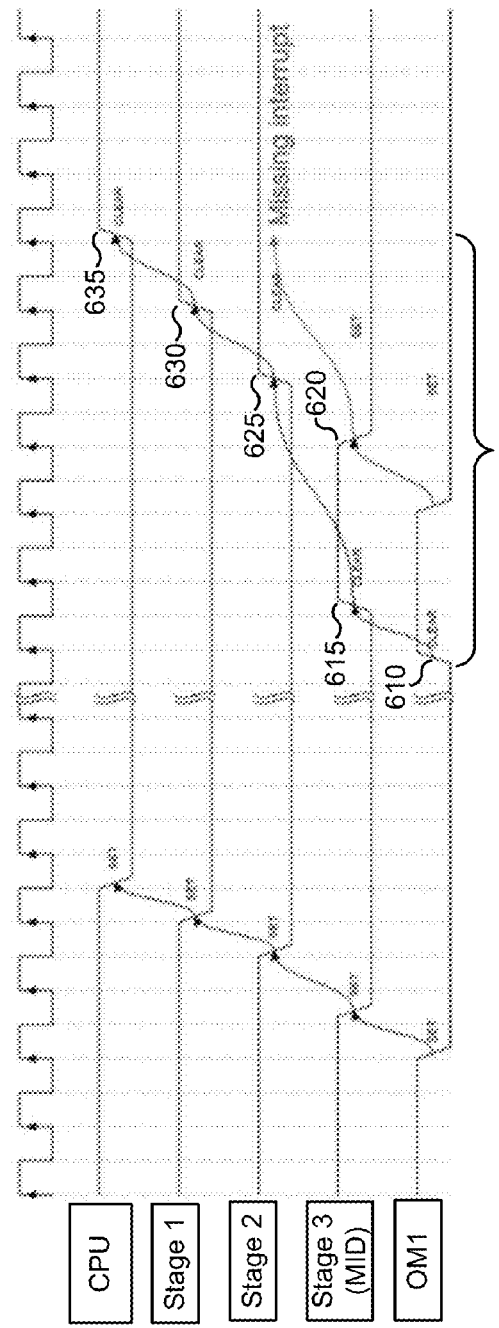
Figure 6C:
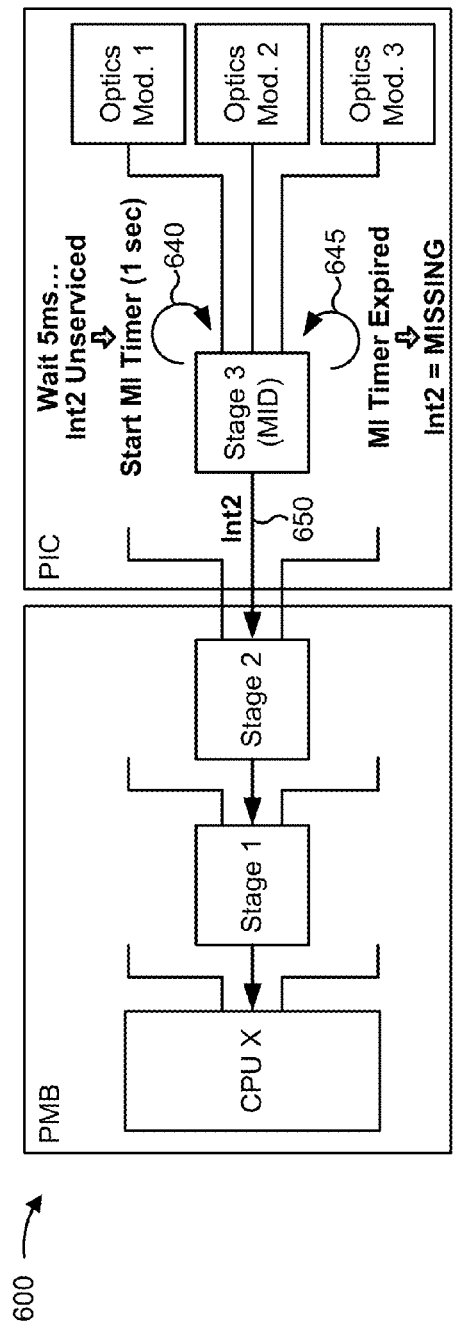
Figure 6C:
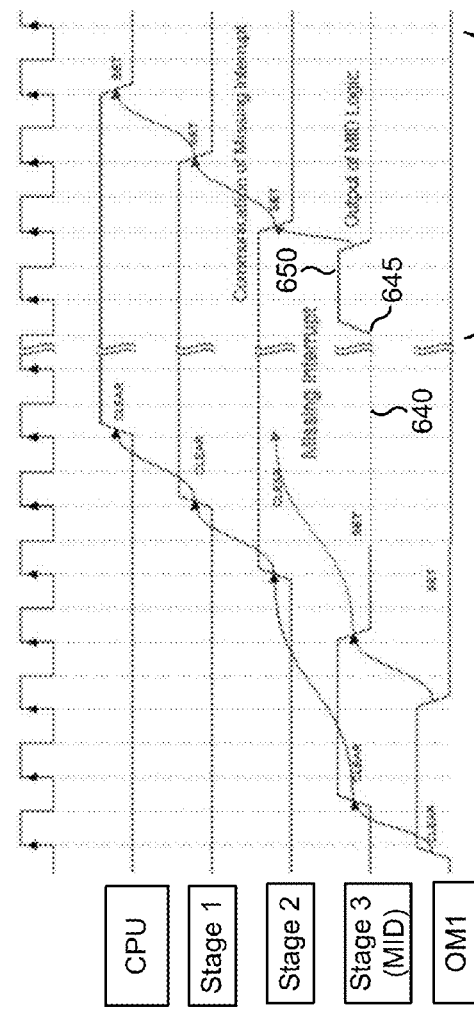

FIGS. 6A-6C are diagrams of an example implementation 500 relating to example process 500 shown in FIG. 5. For the purposes of example implementation 600, and as shown in the upper portion of FIG. 6A, assume that a CPU 310 (e.g., on a PMB and identified as CPU X) is configured to service interrupts associated with a group of devices 330 (e.g., on a PIC and including optics module 1 through optics module 3). Further, assume that CPU X is positioned to receive the interrupts via an interrupt tree that includes a group of stages (e.g., stage 1 through stage 3, where stage 3 is a MID stage).

As shown in FIG. 6A, and by reference number 605, optics module 1 may experience a first interrupt (e.g., Int1), and may send Int1 via an optics module 1 interrupt line (e.g., by causing the optics module 1 line signal to maintain a low level). For the purposes of example implementation 600, assume that stage 3 is a level triggered interrupt stage. As further shown, stage 3 may receive Int1 (e.g., by detecting that the optics module 1 line is at the low level), and may provide Int1 stage 2 (e.g., by causing a level transition on a stage 3 interrupt line). For the purposes of example implementation 600, assume that stage 2 is an edge triggered interrupt stage. As further shown, stage 2 may receive Int1 (e.g., by detecting that the stage 3 interrupt line transition). As further shown, stage 2 may similarly send Int1 to stage 1 (e.g., assume that stage 1 is a level triggered interrupt stage), and stage 1 may send Int1 to the CPU X.

For the purposes of FIG. 6B, assume that CPU X services Int1, and that CPU X is configured to clear Int1 from the interrupt registers associated with Int1 (e.g., in order to indicate that Int1 has been serviced). As shown by reference numbers 610 and 615, CPU X may clear Int1 from the optics module 1 interrupt register (e.g., such that the optics module 1 interrupt line returns to the high level) and the stage 3 interrupt register (e.g., such that the stage 3 interrupt line returns to the high level), respectively. However, as shown by reference number 620, assume that optics module 1 experiences a second interrupt (e.g., Int2) before CPU X clears Int1 from the stage 2 interrupt register (e.g., such that optics module 1 experiences back-to-back interrupts). As shown, optics module 1 may send Int2 via the optics module 1 interrupt line. Stage 3 may receive Int2, and may send Int2 to stage 2 (e.g., without debounce delay logic being implemented by stage 3, after debounce delay logic is implemented by the stage 3, etc.).

As shown by reference number 625, after stage 3 provides Int2, CPU X may clear Int1 from the stage 2 interrupt register. Here, since the stage 2 interrupt register was not cleared (e.g., and the stage 2 interrupt line was still at the low level) before Int2 was sent by stage 3, the interrupt becomes a missing interrupt. As shown, by reference numbers 630 and 635, CPU X may continue clearing Int1 from the other interrupt registers, while the stage 3 interrupt line and the optics module 1 interrupt line remain at the low level due to the missing interrupt.

For the purposes of FIG. 6C, assume that stage 3 is configured to check for unserviced interrupts, sent by optics module 1, five ms after optics module 1 experiences a back-to-back interrupt. As shown by reference number 640, stage 3 may determine, after five ms have passed, that Int2 has yet to be serviced. As shown, stage 3 may then start a one second missing interrupt timer for Int2. As shown by reference number 645, assume that the missing interrupt timer expires (e.g., one second passes), and that stage 3 determines that Int2 has not been cleared from the optics module 1 interrupt register (e.g., that Int2 has not been serviced). As such, stage3 may identify Int2 as a missing interrupt.

As shown by reference number 650, and based on determining that Int2 is a missing interrupt, stage 3 may return the stage 3 interrupt line to the high level, and may resend the second interrupt (e.g., by causing another level transition on the stage 3 interrupt line). As shown, stage 2 may receive the interrupt, and may send the interrupt accordingly.

As indicated above, FIGS. 6A-6C are provided merely as an example. Other examples are possible and may differ from what was described with regard to FIGS. 6A-6C.

Implementations, described herein provide a hardware-based approach for detecting and resending a missing interrupt (e.g., in order to prevent propagation of the missing interrupt). Moreover, implementations described herein may be independent of debounce delay logic included in the system, and/or may be implemented in a system that includes edge triggered interrupts, level triggered interrupts, or both edge triggered interrupts and level triggered interrupts.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A circuit, comprising:
   one or more components to:
      receive an interrupt associated with a device,
         the interrupt relating to an event that needs attention, and
         the interrupt being sent by the device via an interrupt line associated with the device;
      send the interrupt associated with the device, the interrupt being sent via an interrupt line associated with the circuit;
start a missing interrupt timer, associated with the interrupt, based on sending the interrupt,
the missing interrupt timer being associated with a threshold amount of time by which the interrupt is to be serviced;
identify, based on the missing interrupt timer, the interrupt as a missing interrupt; and
resend the missing interrupt via the interrupt line associated with the circuit, the missing interrupt being resent to cause the missing interrupt to be serviced.

2. The circuit of claim 1, where the one or more components are associated with a level triggered interrupt stage included in an interrupt tree.

3. The circuit of claim 1, where the one or more components, when sending the interrupt, are to send the interrupt to an edge triggered stage of an interrupt tree.

4. The circuit of claim 1, where the one or more components, when starting the missing interrupt timer, are to:
wait a particular amount of time after sending the interrupt;
determine, after the particular amount of time, that the interrupt was not serviced within the particular amount of time; and
start the missing interrupt timer based on determining that the interrupt was not serviced within the particular amount of time.

5. The circuit of claim 1, where the interrupt is one interrupt of a set of back-to-back interrupts sent by the device.

6. The circuit of claim 1, where the one or more components, when identifying the interrupt as a missing interrupt, are to:
determine that the interrupt was not serviced within the threshold amount of time associated with the missing interrupt timer; and
identify the interrupt as a missing interrupt based on determining that the interrupt was not serviced within the threshold amount of time.

7. The circuit of claim 1, where the one or more components implement debounce delay logic associated with delaying back-to-back interrupts sent by the device.

8. A method, comprising:
receiving, by a circuit, an interrupt associated with a device,
the interrupt being provided by the device,
the interrupt relating to an event that needs attention, and
the interrupt being received via a first interrupt line;
providing, by the circuit, the interrupt associated with the device,
the interrupt being provided via a second interrupt line;
initiating, by the circuit and after providing the interrupt, a timer associated with the interrupt,
the timer corresponding to a threshold amount of time by which the interrupt is to be serviced;
determining, by the circuit, that the interrupt is not serviced within the threshold amount of time;
identifying, by the circuit and based on determining that the interrupt was not serviced within the threshold amount of time, the interrupt as a missing interrupt; and
re-providing, by the circuit, the missing interrupt,
the missing interrupt being re-provided via the second interrupt line, and
the missing interrupt being re-provided to cause the missing interrupt to be received by a processor associated with servicing the missing interrupt.

9. The method of claim 8, where the circuit is associated with an edge triggered interrupt stage included in an interrupt tree.

10. The method of claim 8, where providing the interrupt comprises providing the interrupt to an edge triggered stage of an interrupt tree.

11. The method of claim 8, further comprising:
waiting for a particular amount of time after providing the interrupt; and
initiating the timer after waiting for the particular amount of time after providing the interrupt.

12. The method of claim 8, where the interrupt is one interrupt of a set of spurious interrupts provided by the device.

13. The method of claim 8, where the threshold amount of time includes at least one of:
a user configured threshold amount of time;
a default threshold amount of time;
a static threshold amount of time; or
a dynamic threshold amount of time.

14. The method of claim 8, where the circuit implements debounce delay logic associated with delaying one or more interrupts provided by the device.

15. A system, comprising:
one or more components associated with a stage of an interrupt tree to:
receive, via an interrupt line associated with a device, an interrupt sent by the device,
the interrupt relating to an event that needs attention;
send, via an interrupt line associated with the one or more components, the interrupt associated with the device,
the interrupt being sent to another stage of the interrupt tree;
determine that the interrupt was not serviced within a threshold amount of time after sending the interrupt;
identify, based on determining that the interrupt was not serviced within the threshold amount of time, the interrupt as a missing interrupt;
resend the missing interrupt via the interrupt line associated with one or more components,
the missing interrupt being resent to cause the missing interrupt to be serviced.

16. The system of claim 15, where the other stage of the interrupt tree is an edge triggered stage of the interrupt tree.

17. The system of claim 15, where the one or more components are further to:
wait a particular amount of time after sending the interrupt;
determine, after the particular amount of time, that the interrupt was not serviced within the particular amount of time; and
start a missing interrupt timer based on determining that the interrupt was not serviced within the particular amount of time,
the missing interrupt timer counting the threshold amount of time.

18. The system of claim 15, where the interrupt is one interrupt of a set of back-to-back interrupts sent by the device.

19. The system of claim 15, where the one or more components implement debounce delay logic associated with delaying interrupts sent by the device.

20. The system of claim 15, where the one or more components, after resending the missing interrupt, are further to:

determine whether the resent interrupt was serviced within the threshold amount of time.

* * * * *